(12) United States Patent
Gotsmann et al.

(10) Patent No.: US 8,374,071 B2
(45) Date of Patent: Feb. 12, 2013

(54) DATA STORAGE DEVICE

(75) Inventors: Bernd W. Gotsmann, Horgen (CH); Armin W. Knoll, Adliswil (CH); Urs T. Duerig, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 12/130,283

(22) Filed: May 30, 2008

(65) Prior Publication Data

US 2008/0292850 A1 Nov. 27, 2008

Related U.S. Application Data

(63) Continuation of application No. 11/752,780, filed on May 23, 2007, now abandoned.

(51) Int. Cl.
*G11B 7/00* (2006.01)

(52) U.S. Cl. .......................... 369/127; 369/126

(58) Field of Classification Search .................. None
See application file for complete search history.

(56) References Cited

U.S. PATENT DOCUMENTS

| | | | | |
|---|---|---|---|---|
| 5,610,898 | A * | 3/1997 | Takimoto et al. | 369/126 |
| 7,170,843 | B2 * | 1/2007 | Hong et al. | 369/101 |
| 7,460,462 | B2 * | 12/2008 | Mejia et al. | 369/126 |
| 2005/0201255 | A1 * | 9/2005 | Champion et al. | 369/126 |
| 2006/0028964 | A1 * | 2/2006 | Mejia et al. | 369/126 |
| 2006/0091322 | A1 | 5/2006 | Despont et al. | |
| 2006/0104172 | A1 * | 5/2006 | Grampel et al. | 369/44.37 |
| 2006/0176353 | A1 * | 8/2006 | Gidon | 347/112 |

OTHER PUBLICATIONS

Barrett, et al. "Large-scale charge storage by scanning capacitance microscopy" Ultramicroscopy 42-44 (1992) pp. 262-267.
Notice of Abandonment for U.S. Appl. No. 11/752,780, filed May 23, 2007; First Named Inventor: Armin W. Knoll; Mail Date: Oct. 15, 2010.
Office Action—Final for U.S. Appl. No. 11/752,780, filed May 23, 2007; First Named Inventor: Armin W. Knoll; Mail Date: Mar. 23, 2010.
Office Action—Non-Final for Application No. 11/752,780, filed May 23, 2007; Mail Date: Sep. 23, 2009.
Vettiger et al. ""The millipede"—More than one thousand tips for future AFM data storage", IBM Journal Research Development, vol. 44, No. 3, May 2000, pp. 323-340.

* cited by examiner

*Primary Examiner* — Hoa T Nguyen
*Assistant Examiner* — Emily Frank
(74) *Attorney, Agent, or Firm* — Cantor Colburn LLP

(57) ABSTRACT

The present invention relates to a data storage device comprising: a polymer layer for storing data in the form of topographic features; a substrate comprising a conductor, a first surface of the polymer layer being provided on the substrate; and at least one probe which, when the device is in use, interacts with a second surface of the polymer layer, wherein, when in use, the data storage device is operable to apply a first electrical potential to the at least one probe relative to the substrate, thereby to cause a protrusion to be formed on the second surface of the polymer layer.

22 Claims, 3 Drawing Sheets

- (+4 V tip voltage)
- Average line line-scans.
- Time:
- 10 min – A
- 7:48 h – B
- 23:03 h – C

DATA STORAGE DEVICE

CROSS REFERENCE TO RELATED APPLICATIONS

This application is a continuation application of U.S. Ser. No. 11/752,780 filed May 23, 2007, the contents of which are incorporated by reference herein in their entirety.

FIELD OF THE INVENTION

The present invention relates to a data storage device and particularly to a probe-type data storage device.

BACKGROUND OF THE INVENTION

In previously-proposed data storage media such as hard disk-drives or optical disk drives, information is encoded magnetically, optically or a combination thereof onto a disk. This information is retrieved by detecting a signal corresponding to the method used for encoding the information, that is, by detecting magnetic stray fields, changes of optical reflectivity or a combination thereof, respectively. Due to the nature of the signals to be detected, sophisticated detectors are used. Thus, such data storage media may not be suitable for use with probe-type data storage devices.

A probe-type data storage device based on the atomic force microscope (AFM) is disclosed in "The millipede—more than 1,000 tips for future AFM data storage" by P. Vettiger et al., IBM Journal Research Development, Vol. 44, No. 3, March 2000. The storage device has a read and write function based on a mechanical x-, y-scanning of a storage medium with an array of probes each having a tip. The probes operate in parallel with each probe scanning, during operation, an associated field of the storage medium. The storage medium comprises a polymethylmethacrylate (PMMA) layer. The tips, which each have a diameter of between 5 nm to 40 nm, are moved across the surface of the polymer layer in a contact mode. The contact mode is achieved by applying forces to the probes so that the tips of the probes can touch the surface of the polymer layer. For this purpose, the probes comprise cantilevers, which carry the tips on their end sections. Bits are represented by indentation marks, each encoding a logical "1", or non-indentation marks, each encoding a logical "0", in the polymer layer. The cantilevers respond to these topographic changes while they are moved across the surface of the polymer layer during operation of the device in read/write mode.

Indentation marks are formed on the polymer layer by thermomechanical recording. This is achieved by heating the tip of a respective probe operated in contact mode with respect to the polymer layer. Heating of the tip is achieved via a heater dedicated to the writing/formation of the indentation marks. The polymer layer softens locally where it is contacted by the heated tip. The result is an indentation mark, for example, having a nanoscale diameter comparable to the diameter of the tip that is used in its formation, being produced on the layer. Reading of the indentation mark is also accomplished by a thermomechanical concept and may be done using the same probe as that used for writing the indentation mark. Due to the mechanical stress that is used for writing indentation marks in the polymer layer, tip and/or media wear may be typically expected to occur.

In another previously-proposed probe-type data storage device as described in Ultramicroscopy, 42-44 (1992) 262, data is encoded on an insulator such as Nitride-Silicon Dioxide-Silicon by charge injection, that is, bits are represented by localized trapped charges on the insulator surface. Thus, each trapped charge denotes a logical "1" and the absence thereof denotes a logical "0". Data is retrieved by detecting the electrical stray field associated to each of the localized trapped charges, which field gives rise to a measurable but relatively small interaction force that is on the order of, for example, 1 nN. Other issues that may need to be considered in the detection of the localized trapped charges are: (1) the aforementioned electrical stray field is long range by nature and so may result in the "smearing out" of a bit location; (2) a localized trapped charge is typically screened by polar contaminants, for example, water molecules, thereby reducing the magnitude of an associated electrical stray field by an order of magnitude within a short time, typically within 24 hours, of charge injection, and (3) the magnitude of the aforementioned interaction force may limit data rates on the order of kHz rather than MHz In yet another previously-proposed probe-type data storage device, bits are stored as oriented domains in ferroelectric media analogous to magnetic recording. Detection of an electric dipole orientation associated to a domain may be performed by measuring the strength of a corresponding electrical stray field. However, the issues listed under (1) to (3) above may also need to be considered in the present case. Alternatively, detection of the electric dipole orientation may be done by measuring the piezo-electric response, which induces minute, well-localized modulations of the surface topography on the order of a fraction of a nanometer, which requires sensitive lock-in schemes for their detection. In this case, it could be that signal degradation may be avoided by the electromechanical transduction. However, by virtue of being on the order of 0.1 nm, the topographic features may be comparable to or less than the roughness of the surface on which they are present. Furthermore, the detection of such sub-nanometer dimensioned features using known detectors may typically be done with a limited data rate in the kHz range.

Accordingly, it is desirable to provide a data storage device having topographic features that may be detected with relative ease compared to previously-proposed devices.

SUMMARY OF THE INVENTION

According to an embodiment of a first aspect of the present invention, there is provided a data storage device comprising: a polymer layer for storing data in the form of topographic features; a substrate comprising a conductor, a first surface of the polymer layer being provided on the substrate; and at least one probe which, when the device is in use, interacts with a second surface of the polymer layer, wherein, when in use, the data storage device is operable to apply a first electrical potential to the at least one probe relative to the substrate, thereby to cause a protrusion to be formed on the second surface of the polymer layer. A protrusion formed in an embodiment of the present invention has a height of nanometer-scale dimension, for example, by applying a first electrical potential of <10V to the at least one probe, which interacts with the second surface of the polymer layer by direct contact, a protrusion of up to 20 nm height may be formed. The protrusions thus formed have a high aspect ratio, on the order of 1, which makes it possible to detect them with relative ease compared to topographic features in previously-proposed data storage devices.

Preferably, the at least one probe interacts with the second surface of the polymer layer by being in contact therewith. In this case, the magnitude of the first electrical potential applied to the at least one probe is relatively lower than if the second surface of the polymer layer and the at least one probe were separated in order to achieve the formation of a protrusion.

Desirably, once the at least one probe is brought into contact with the second surface of the polymer layer, it is scanned relative thereto and/or a loading force is applied to the at least one probe. Formation of the protrusion on the second surface of the polymer layer may be assisted by a scanning motion of the at least one probe and/or a vertical impact motion of the at least one probe in response to a loading force being applied thereto. By way of example, the loading force applied to the at least one probe may be a pre-defined value in a range of 10 nN to 100 nN.

Alternatively, the at least one probe interacts with the second surface of the polymer layer by being out of contact. In this case, it is preferable that the distance between the at least one probe and the second surface of the polymer layer is at least 1 nm. In this alternative case, neither the second surface of the polymer layer nor the at least one probe are subjected to wear.

Preferably, the device is operable to apply a second electrical potential to the at least one probe, which interacts with the second surface of the polymer layer in the region where the protrusion has been formed, the second electrical potential having an opposite polarity to the first electrical potential. By the selection of an appropriate polarity and magnitude for the second electrical potential, a protrusion formed on the second surface of the polymer layer may be enhanced, reduced or the second surface of the polymer layer may even be returned to an uncharged, neutral state. Furthermore, such reversible operation allows modification of the topographic landscape of the second surface of the polymer layer to be done sequentially.

Preferably, the device is operable to apply heat, irradiation or a combination thereof to the polymer layer. Protrusions formed on the second surface of the polymer layer may be globally removed by applying a suitable form of energy such as, for example, the application of heat, irradiating with ultraviolet radiation and/or charged particles, or a combination thereof In this way, the second surface of the polymer layer may be returned to a state where new data may subsequently be written thereon in a simple and time-efficient manner. In this case, it is preferable that the polymer layer is heated to a temperature of between 100° C. to 200° C. Since the decay rate of the injected charge typically increases by one order of magnitude per 20° C. change in temperature, charge could be neutralized in a timescale of seconds by heating the polymer layer to temperatures between 100° C. to 200° C. in an embodiment of the present invention.

Preferably, the polymer layer comprises polystyrene-r-benzocyclobutene 30% random copolymer, PS-30%-BCB. In an embodiment of the present invention, the polymer layer comprises a cross-linkable and non-conducting polymer such as, for example, polystyrene-r-benzocyclobutene 30% random copolymer, PS-30%-BCB. By virtue of these properties being exhibited by the polymer layer, a protrusion formed on the second surface of the polymer layer remains localized thereon without substantially losing its form for a period of time spanning days for storage of the polymer layer at room temperature Desirably, the at least one probe is a cantilevered probe with a tip having an apex dimension of up to 50 nm. Such an apex dimension of the tip allows a data density of >1 Tb/in^2 to be achieved.

Preferably, the at least one probe interacts with the second surface of the polymer layer via a surface having a patterned structure. In this case, the patterned structure may be in accordance with how topographic patterning of the second surface of the polymer layer is desired. For example, it could be that the surface having a patterned structure may be pre-fabricated and later directly affixed to the tip of the probe. It could also be that the surface having a patterned structure is, for example, a mask, by way of which the tip of the at least one probe interacts with the second surface of the polymer layer.

A corresponding method aspect of the invention is also provided, and thus in a second aspect of the present invention there is provided a method for producing a data storage device, the data storage device comprising a polymer layer, a first surface of which is provided on a substrate comprising a conductor, the method comprising the steps of:

interacting at least one probe with a second surface of the polymer layer; and applying a first electrical potential to the at least one probe relative to the substrate, thereby to cause a protrusion to be formed on the second surface of the polymer layer.

The present invention also extends to a data storage device comprising a polymer layer, a surface of which is patterned with topographic features using a device according to a first aspect of the present invention or a method according to a second aspect of the present invention.

Any of the device features may be applied to the method aspect of the invention and vice versa. Features of one aspect may be applied to any other aspect. Any disclosed embodiment may be combined with one or several of the other embodiments shown and/or described. This is also possible for one or more features of the embodiments.

DESCRIPTION OF THE DRAWINGS

Reference will now be made, by way of example, to the accompanying drawings, in which.

DETAILED DESCRIPTION OF THE INVENTION

Figure 1A:
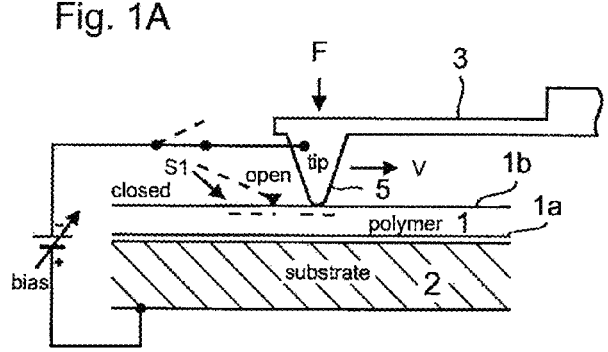
FIGS. 1a and 1b schematically illustrate an embodiment of the present invention.
Figure 1B:
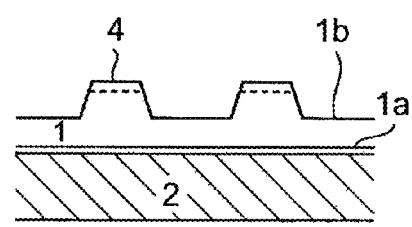

FIGS. 1a and 1b schematically illustrate an embodiment of the present invention.

As can be seen from FIG. 1a, there is provided a polymer layer 1, which may comprise polystyrene-r-benzocyclobutene 30% random copolymer, PS-30%-BCB. The present invention is, however, not limited to PS-30%-BCB and any other polymer that is non-conducting and, optionally, cross-linkable may be used. The thickness of the polymer layer 1 is, in the present example, 100 nm, but is not restricted thereto.

A first surface 1a of the polymer layer 1 is provided on a substrate 2. The substrate 2 comprises silicon with an n-type doping concentration of, for example, $10^{16}$ cm$^{-3}$. The substrate 2 is, of course, not limited to the use of silicon and any other material having an appropriate electrical conductance may be used. The first surface 1a of the polymer layer 1 may be provided directly on the substrate 2 or on a spacer layer which may, for example, be silicon oxide A second surface 1b of the polymer layer 1 is provided so as to interact with at least one probe 3 either by being in contact with or in close proximity to/being out of contact with a tip 5 of the at least one probe 3. In the example shown in FIG. 1a, the at least one probe 3 is a cantilevered probe having a conducting tip 5. The tip 5 may, for example, have an apex with a 50 nm radius of curvature and comprise $10^{17}$ cm$^{-3}$ n-doped Si having a resistivity of 0.1 Ohm cm. The tip is typically covered by 2-5 nm of native oxide. The cantilever may, for example, comprise silicon and have a spring constant, C, of, for example, 2.25+/−0.25 Nm-1.

By applying an electrical potential, a first electrical potential P1, to the at least one probe 3 relative to the substrate 2 via an electrical switch S1, charge is injected onto the second surface 1b of the polymer layer 1. By virtue of the polymer layer 1 comprising a material that is non-conducting, the charge injected in the second surface 1b of the polymer layer 1 remains localized on the surface thereof. As can be seen from FIG. 1b, where the charge is injected on the second surface 1b of the polymer layer 1, the polymer material swells and a protrusion 4 is formed.

In an embodiment of the present invention, electromechanical transduction, that is, the transduction of an electrical signal, which is the electrical potential applied to the at least one probe 3, to cause the injection of charge onto the second surface 1b of the polymer layer 1 via the tip 5 of the at least one probe 3 and thereby a charge-induced swelling/protrusion to be formed on the second surface 1b of the polymer layer 1, is used to topographically pattern the surface of a polymer layer 1. Thus, bits may be represented by protrusions 4, each encoding a logical "1", or a region where they are absent denoting a logical "0", in the polymer layer 1.

Operation of an embodiment of the present invention where interaction between the at least one probe 3 and the second surface 1b of the polymer layer 1 is done by establishing contact is described herebelow. Such mode of operation will hereinafter be referred to as the contact mode of operation.

With reference to FIG. 1a, the tip 5 is brought into contact with the second surface 1b of the polymer layer 1 using a force that is, for example, between 10 nN and 100 nN. By closing switch S1, a first electrical potential P1 of the order of less than 10V is applied to the at least one probe 3 with respect to the substrate 2. Thus, charge is injected into the second surface 1b of the polymer layer 1 via the tip 5.

Charge injection in the contact-mode may be assisted by a scanning motion of the at least one probe 3 and/or a vertical impact motion of the at least one probe 3 in response to a loading force being applied thereto. By way of example, the loading force applied to the at least one probe 3 may be a pre-defined value in a range of 10 nN to 100 nN. By virtue of the tip 5 of the at least one probe 3, to which the first electrical potential P1 is applied, being rubbed relative to the second surface 1b of the polymer layer 1, charge is injected on the surface thereof by a triboelectric effect.

As discussed previously, interaction between the at least one probe 3 and the second surface 1b of the polymer layer 1 may be done by holding them in close proximity thereto, this mode of operation being hereinafter referred to as the non-contact mode of operation. In this case, the tip 5 of the at least one probe 3 and the second surface 1b of the polymer layer are held at a separation of at least 1 nm. Thus, the tip 5 of the at least one probe 3 and the second surface 1b of the polymer layer 1 are respectively subjected to less wear than is the case for contact mode operation.

For operation in the contact-mode, the amount of charge that may be injected on the second surface 1b of the polymer layer 1 is on the order of $\epsilon_0$ multiplied by the first electrical potential P1 applied to the at least one probe 3 divided by the depth by which the charge carriers can penetrate into the polymer layer 1, or the penetration depth, where $\epsilon_0 = 8.84 \times 10^{-12}$ CV$^{-1}$ m$^{-1}$ and the penetration depth is on the order of 1 nm. Hence, charge densities on the order of 0.1 electron/nm$^2$ may be achieved with a first electrical potential P1 of <10V being applied to the at least one probe 3. This is particularly advantageous when compared to the injection of charge by field emission as done when operation is conducted in the non-contact mode where, in order to achieve the above-mentioned charge densities, the magnitude of the first electrical potential P1 applied to the at least one probe 3 would be have to be on the order of 100V. This also has the associated effect that the injected charge would penetrate deeper into the second surface 1b of the polymer layer 1 than would be the case for operation in the contact-mode.

Figure 2:
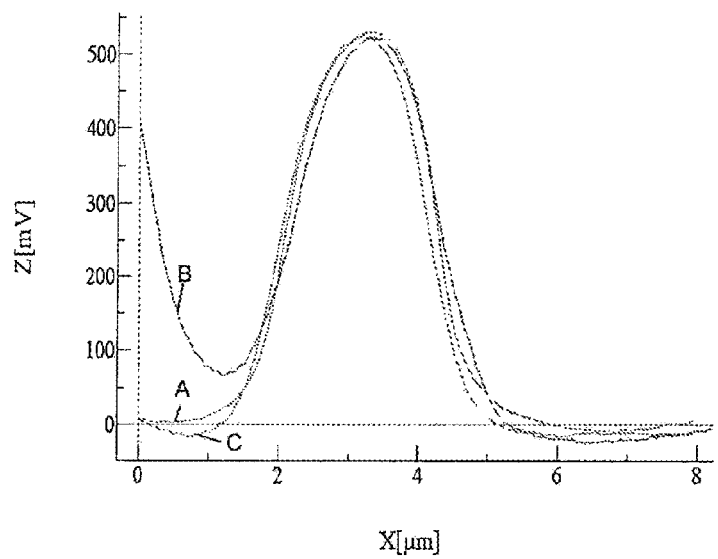
FIG. 2 demonstrates a charge retention capability of an embodiment of the present invention, FIG. 3 demonstrates the reversible operation of an embodiment of the present invention.

Experimental results pertaining to an embodiment of the present invention have shown that when the polymer layer 1 comprises, in particular, PS-30%-BCB, not only does the charge injected on the second surface 1b accumulate at the surface thereof but also that this charge is retained without substantial dissipation for a period of time spanning days for the storage of the polymer layer 1 at room temperature. One such result is shown in FIG. 2 where the charge injected onto a polymer layer 1 comprising PS-30%-BCB was measured 10 minutes (denoted by A), 7.48 hours (denoted by B) and 23.03 hours (denoted by C), respectively, after charge injection was effectuated. As can be seen from FIG. 2, almost no degradation of charge occurred over a 24-hour period. Such retention capability of charge is, of course, desirable in data-storage applications.

Due to the injected charge being localized on the second surface 1b of the polymer layer 1, reversible operation of an embodiment of the present invention is possible, that is, the polarity of the charge injected onto the second surface 1b of the polymer layer 1 can be reversed. This is preferably done by arranging the at least one probe 3 so that its tip 5 interacts with the region on the second surface 1b where charge has been injected, i.e. where a protrusion has been formed, and applying a second electrical potential P2 that is of opposite polarity to the first electrical potential P1 to the at least one probe 3. In this case, the at least one probe 3 may, for example, be rescanned on the charged area on the second surface 1b of the polymer layer 1. By the selection of an appropriate polarity and magnitude for the second electrical potential P2, a protrusion 4 formed on the second surface 1b of the polymer layer 1 may be enhanced, reduced or the second surface 1b may even be returned to an uncharged, neutral state. Furthermore, such reversible operation allows modification of the topographic landscape of the second surface 1b of the polymer layer 1 to be done sequentially.

Figure 3:
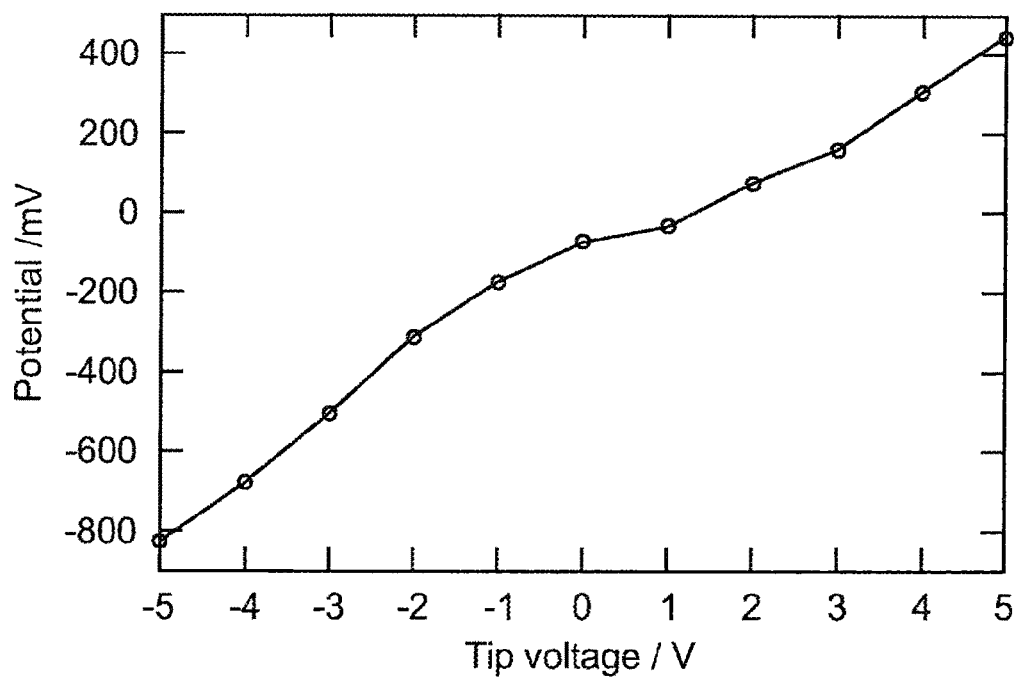
Figure 4A:
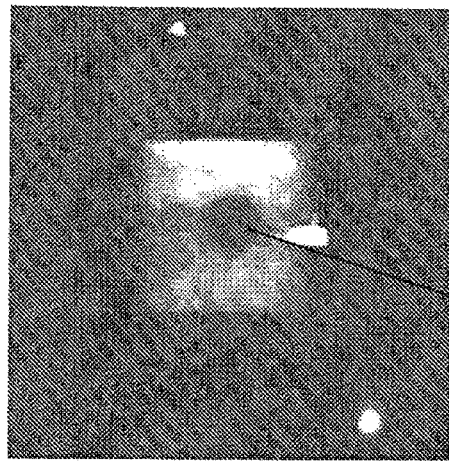
FIG. 4 is a further example of the reversible operation of an embodiment of the present invention.
Figure 4B:
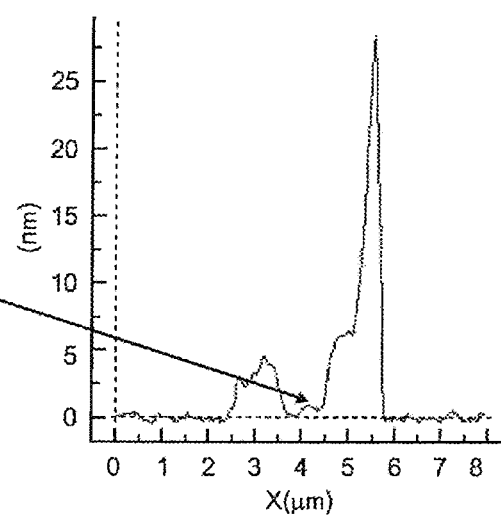
Figure 4C:
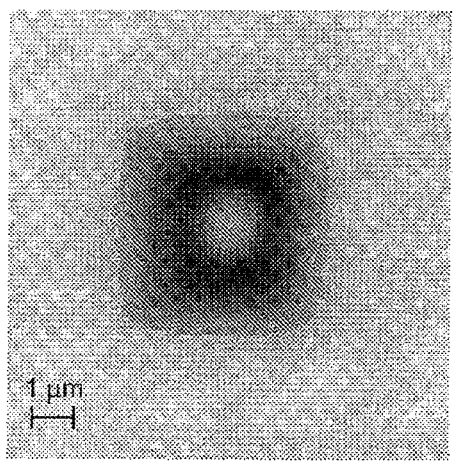
Figure 4D:
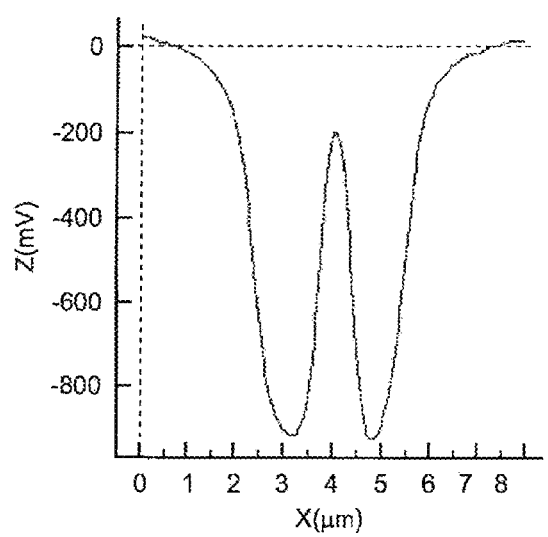

Reference is now made to FIG. 3 in order to describe the reversible operation of an embodiment of the present invention. FIG. 3 is a plot of the measured electrostatic potentials for charge injected onto the second surface 1b of the polymer layer 1 comprising PS-30%-BCB by the application of a specific value of electrical potential to the at least one probe 3. In the present case, charge injection was effectuated by operation in the contact mode. The charge was injected in a 2 μm by 2 μm panel of an 8 μm by 8 μm area on the second surface 1b. Measurement of the electrostatic potentials was done by retracting the tip 5 of the at least one probe 3 from the second surface 1b of the polymer layer 1 after charge injection had been effectuated and then measuring the electrostatic potential as seen by the tip 5 relative to the substrate 2 with the switch S1 in an open state.

As can be seen from FIG. 3, for the application of a first electrical potential P1 of −5V to the at least one probe 3, a negative charge is injected onto the second surface 1b of the polymer layer 1, this being denoted by the measured electrostatic potential, −800 mV, having a corresponding polarity. It can also be seen from FIG. 3 that by subsequently applying a second electrical potential P2 of increasing magnitude and/or opposite polarity, the measured electrostatic potential changes in a corresponding manner. The results shown in FIG. 3 thus demonstrate that, by the selection of an appropriate polarity and magnitude for the second electrical potential P2, a protrusion 4 formed on the second surface 1b of the polymer layer 1 may be enhanced, reduced or the second surface 1b may even be returned to an uncharged, neutral state. In the example shown in FIG. 3, the latter occurs when a second electrical potential P2 of +1V is applied to the at least one probe 3.

A further example of the reversible operation of an embodiment of the present invention is shown in FIG. 4. FIG. 4a shows a topographic image of a 2 µm by 2 µm panel on the second surface 1b of a polymer layer 1 comprising PS-30%-BCB that was charged using a first electrical potential P1 of −5V and contact-mode operation. As can be seen, the charged area is resolved with much better resolution, less than 50 nm judging from the edges, than in the corresponding potential image shown in FIG. 4c. This illustrates that charge injection in an embodiment of the present invention leads to the formation of a localized topographic feature with a height of several nanometers that can be detected with relative ease using known AFM imaging techniques as well as thermal imaging techniques compared to topographic features in previously-proposed data storage devices. The central/circular region of the 2 µm by 2 µm panel denotes where charge has locally and subsequently been erased by the application of a second electrical potential P2 of +5 V. From the line-scan shown in FIG. 4b that was taken through the 2 µm by 2 µm panel of the topographic image shown in FIG. 4a, it can be seen that the topographic height of the feature substantially reverted to its initial state where charge had been locally erased. This is also reflected in the line-scan shown in FIG. 4d that was taken through the 2 µm by 2 µm panel of the corresponding potential image shown in FIG. 4c since the measured potential where charge had been locally erased being −200 mV is greater than in the still-charged areas, these being depicted by the troughs where the measured potential is shown to be <−800 mV.

The charge injected onto the second surface 1b of the polymer layer 1, and therefore the topographic features/protrusions 4 created thereon, may be globally removed by applying a suitable form of energy such as, for example, the application of heat, irradiating with ultra-violet radiation and/or charged particles, or a combination thereof Since the decay rate of the injected charge typically increases by one order of magnitude per 20° C. change in temperature, charge could be neutralized in a timescale of seconds by heating the polymer layer to temperatures between 100° C. to 200° C.

The at least one probe 3 may be provided so as to interact with the second surface 1b of the polymer layer 1 via a surface having a patterned structure that is in accordance with how topographic patterning of the second surface of the polymer layer is desired. For example, it could be that the surface having a patterned structure may be pre-fabricated and later directly affixed to the tip of the probe. It could also be that the surface having a patterned structure is, for example, a mask, by way of which the tip of the at least one probe interacts with the second surface of the polymer layer.

The present invention has been described above purely by way of example and modifications of detail can be made within the scope of the invention.

Each feature disclosed in the description and (where appropriate) claims and drawings may be provided independently or in any appropriate combination.

The invention claimed is:

1. A data storage device comprising:
   (1) a non-conductive polymer layer for storing data in the form of topographic features, wherein the non-conductive polymer layer locally swells in response to an applied charge thereto; a substrate comprising a conductor, a first surface of the polymer layer being provided on the substrate; and
   (2) at least one probe which, when the device is in use, interacts with a second surface of the non-conductive polymer layer, wherein, when in use, the data storage device includes a probe tip operable to apply a first electrical potential relative to the substrate and inject a localized charge into the non-conductive polymer layer and cause a charge induced swelling to protrude from the second surface of the polymer layer.

2. A data storage device as claimed in claim 1 wherein the at least one probe interacts with the second surface of the polymer layer by being in contact therewith.

3. A data storage device as claimed in claim 2 wherein, once the at least one probe is brought into contact with the second surface of the polymer layer, it is scanned relative thereto and/or a loading force is applied to the at least one probe.

4. A data storage device as claimed in claim 1 wherein the at least one probe interacts with the second surface of the polymer layer by being out of contact.

5. A data storage device as claimed in claim 4 wherein the distance between the at least one probe and the second surface of the polymer layer is at least 1 nm.

6. A data storage device as claimed in claim 1 wherein the device is operable to apply a second electrical potential to the at least one probe, which interacts with the second surface of the polymer layer in the region where the protrusion has been formed, the second electrical potential having an opposite polarity to the first electrical potential.

7. A data storage device as claimed in claim 1 wherein the device is operable to apply heat, irradiation or a combination thereof to the polymer layer.

8. A data storage device as claimed in claim 7 wherein the polymer layer is heated to a temperature of between 100° C. to 200° C.

9. A data storage device as claimed in claim 1 wherein the polymer layer comprises polystyrene-r-benzocyclobutene 30% random copolymer, PS-30%-BCB.

10. A data storage device as claimed in claim 1 wherein the at least one probe comprises a cantilevered probe with a tip having an apex dimension of up to 50 nm.

11. A data storage device as claimed in claim 1 wherein the at least one probe interacts with the second surface of the polymer layer via a surface having a patterned structure.

12. A method for producing a data storage device, the data storage device comprising a non-conductive polymer layer, wherein the non-conductive polymer layer locally swells in response to an applied charge thereto, a first surface of which is provided on a substrate comprising a conductor, the method comprising the steps of:
   (1) interacting at least one probe with a second surface of the polymer layer and
   (2) applying a first electrical potential to the at least one probe relative to the substrate, wherein the probe is configured and the first electrical potential is effective to inject a localized charge into the non-conductive polymer layer to cause a charge induced swelling to protrude from the second surface of the polymer layer.

13. A method as claimed in claim 12 wherein the at least one probe interacts with the second surface of the polymer layer by being in contact therewith.

14. A method as claimed in claim 13 further comprising the step of scanning the at least one probe relative to the second surface of the polymer layer and/or applying a loading force to the at least one probe once the at least one probe is brought into contact with the second surface of the polymer layer.

15. A method as claimed in claim 12 wherein the at least one probe interacts with the second surface of the polymer layer by being out of contact.

16. A method as claimed in claim 15 wherein the distance between the at least one probe and the second surface of the polymer layer is at least 1 nm.

17. A method as claimed in claim 12 further comprising the step of applying a second electrical potential to the at least one probe, which interacts with the second surface of the polymer layer in the region where the protrusion has been formed, the second electrical potential having an opposite polarity to the first electrical potential.

18. A method as claimed in claim 12 further comprising the step of applying heat, irradiation or a combination thereof to the polymer layer.

19. A method as claimed in claim 18 wherein the polymer layer is heated to a temperature of between 100° C. to 200° C.

20. A method as claimed in claim 12 wherein the polymer layer comprises polystyrene-r-benzocyclobutene 30% random copolymer, PS-30%-BCB.

21. A method as claimed in claim 12 wherein the at least one probe comprises a cantilevered probe with a tip having an apex dimension of up to 50 nm.

22. A method as claimed in claim 12 wherein the at least one probe interacts with the second surface of the polymer layer via a surface having a patterned structure.

* * * * *